US008283087B2

(12) United States Patent
Obika (10) Patent No.: US 8,283,087 B2
(45) Date of Patent: Oct. 9, 2012

(54) SEAL STRUCTURE ADOPTED IN MEMBRANE ELECTRODE ASSEMBLY FOR FUEL CELL (75) Inventor: Motoharu Obika, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/919,998

(22) PCT Filed: Feb. 27, 2009

(86) PCT No.: PCT/JP2009/054229
§ 371 (c)(1),
(2), (4) Date: Aug. 27, 2010

(87) PCT Pub. No.: WO2009/107872
PCT Pub. Date: Sep. 3, 2009

(65) Prior Publication Data
US 2011/0003232 A1    Jan. 6, 2011

(30) Foreign Application Priority Data

Feb. 29, 2008    (JP) .................................. 2008-050517

(51) Int. Cl.
*H01M 8/10* (2006.01)
(52) U.S. Cl. ........................................ 429/479; 429/469
(58) Field of Classification Search .................. 429/479, 429/465, 468, 470, 471
See application file for complete search history.

(56) References Cited

U.S. PATENT DOCUMENTS

| 7,276,310 | B2 | 10/2007 | Kobayashi et al. |
| 7,432,008 | B2* | 10/2008 | Joos et al. ..................... 429/437 |
| 8,026,018 | B2 | 9/2011 | Ohma et al. |
| 2002/0064703 | A1 | 5/2002 | Mizuno |
| 2007/0111078 | A1* | 5/2007 | Tanno ............................. 429/34 |

FOREIGN PATENT DOCUMENTS

| CA | 2 619 237 A1 | 3/2007 |
| JP | 2000-182639 A | 6/2000 |
| JP | 2003-068318 A | 3/2003 |
| JP | 2004-319461 A | 11/2004 |
| JP | 2006-114227 A | 4/2006 |
| JP | 2006-338939 A | 12/2006 |
| JP | 2007-66767 A | 3/2007 |
| JP | 2007-66769 A | 3/2007 |
| JP | 2007-095669 A | 4/2007 |
| JP | 2008-004448 A | 1/2008 |

* cited by examiner

*Primary Examiner* — Jennifer Michener
*Assistant Examiner* — Monique Wills
(74) *Attorney, Agent, or Firm* — Foley & Lardner LLP (57) ABSTRACT First reinforcing members, having a low modulus of elasticity, are disposed between an electrolyte membrane and second reinforcing members having a high modulus of elasticity, so as not to allow the electrolyte membrane to readily rub against the first reinforcing members as the electrolyte membrane expands and shrinks and to ultimately prevent degradation of the electrolyte membrane.

15 Claims, 6 Drawing Sheets

SEAL STRUCTURE ADOPTED IN MEMBRANE ELECTRODE ASSEMBLY FOR FUEL CELL

TECHNICAL FIELD

This invention relates to a seal structure that may be adopted in a membrane electrode assembly for a fuel cell.

BACKGROUND ART

JP2006-338939A issued by the Japan Patent Office in the year 2006 discloses a fuel cell membrane electrode assembly with a gasket layer that does not allow a gas to be transmitted through, formed over an outer edge area of an electrolyte membrane.

DISCLOSURE OF THE INVENTION

There is an issue to be addressed with regard to such a fuel cell membrane electrode assembly in that as the electrolyte membrane expands due to thermal expansion or the like and the gasket layer and the electrolyte membrane rub against each other, the electrolyte membrane may become degraded.

Accordingly, an object of this invention is to prevent degradation of the electrolyte membrane.

In order to achieve the object described above, a fuel cell membrane electrode assembly according to this invention comprises an electrolyte membrane, electrodes, one disposed at a front surface and another disposed at a rear surface of the electrolyte membrane so as to leave an electrolyte membrane outer edge area exposed, first reinforcing members, one disposed at the front surface and another disposed at the rear surface of the electrolyte membrane over the electrolyte membrane outer edge area having a higher modulus of elasticity than the electrolyte membrane and a smaller coefficient of thermal expansion than the electrolyte membrane; and second reinforcing members disposed at front surfaces of the first reinforcing members, having a higher modulus of elasticity than the first reinforcing members.

Other objects, structural features and advantages of the present invention will be explained in further detail by referring to the attached drawings.

BRIEF DESCRIPTION OF THE DRAWINGS

FIG. 1 is a perspective of a fuel cell stack that may be used in a fuel cell system in an automobile or the like.

BEST MODES FOR CARRYING OUT THE INVENTION

Figure 1:
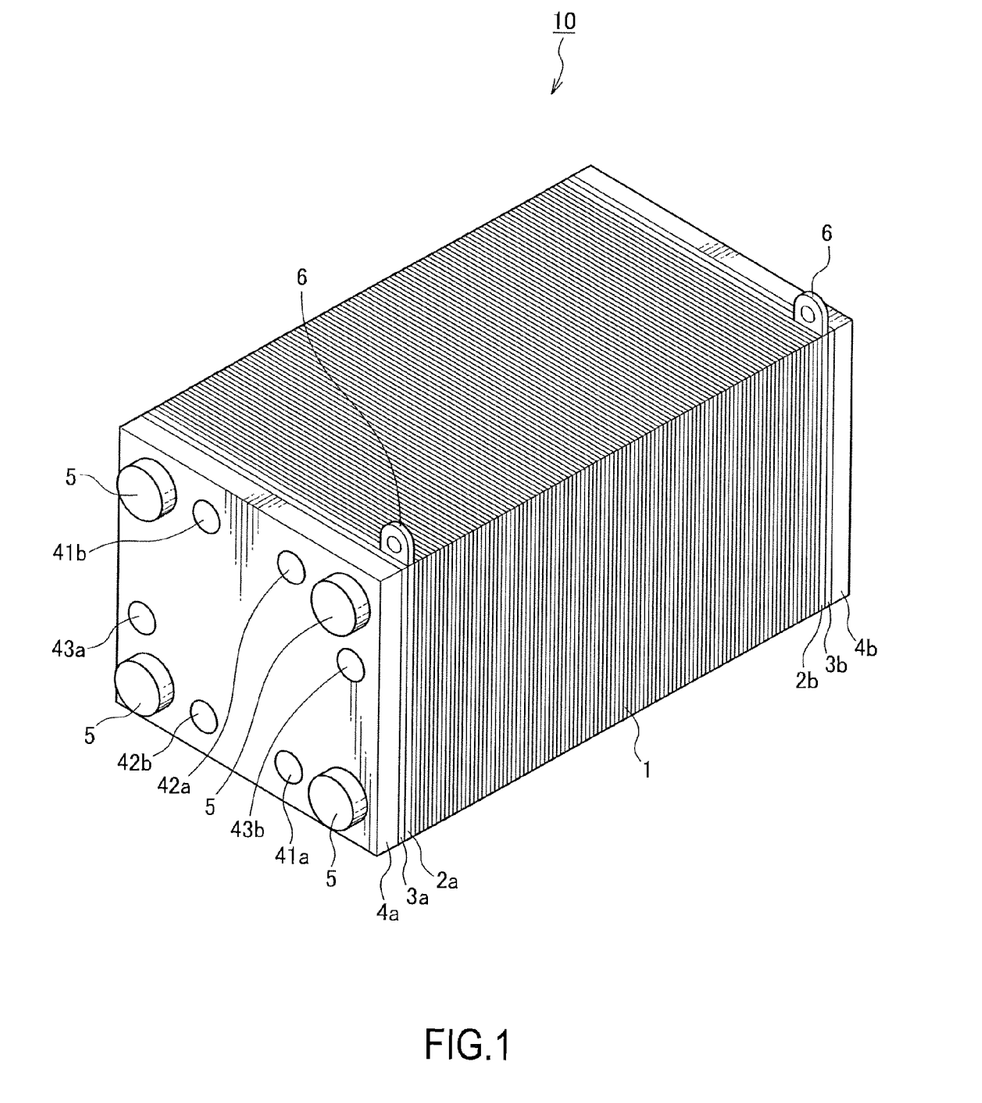
Figure 2:
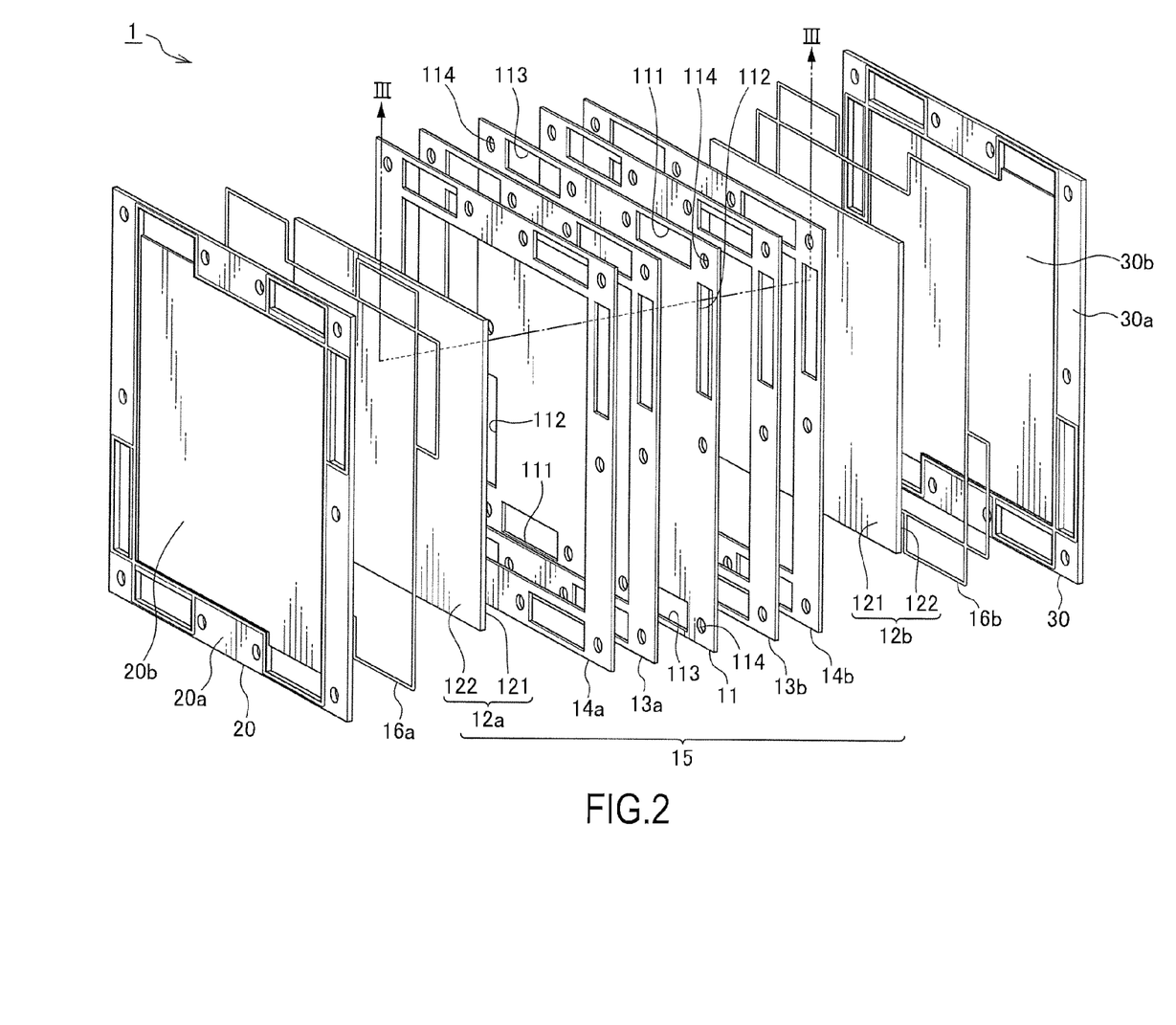
FIG. 2 is an exploded perspective of a single cell that includes a membrane electrode assembly according to this invention.
Figure 3:
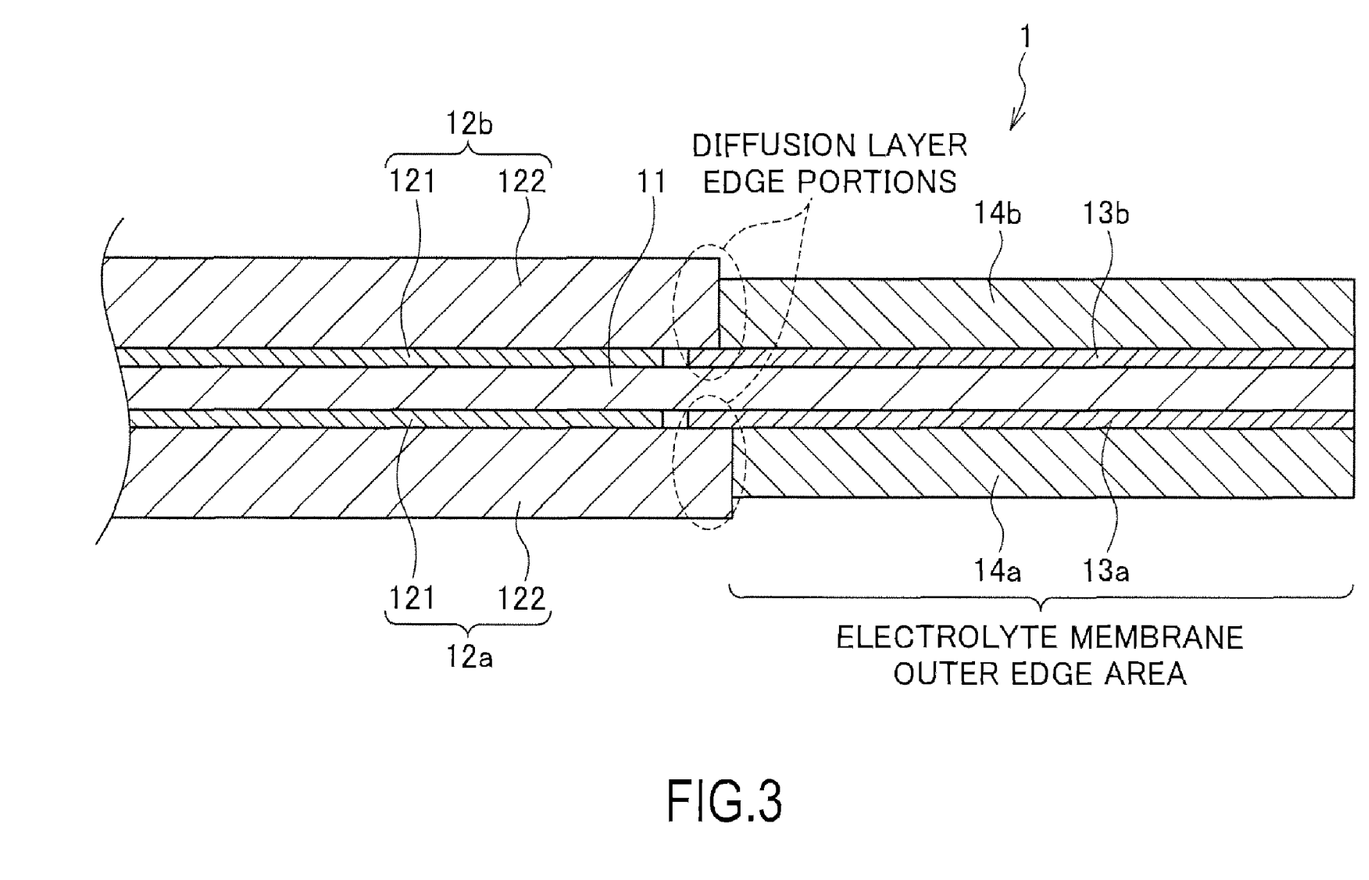
FIG. 3 is a sectional view of an essential portion of the single cell, taken along line III-III in FIG. 2.

In reference to FIGS. 1 through 3, a first embodiment of this invention is described.

A fuel cell, which includes an electrolyte membrane held between an anode functioning as a fuel electrode and a cathode functioning as an oxidizing electrode, generates power as an anode gas (fuel gas) containing hydrogen is supplied to the anode and a cathode gas (oxidizing gas) containing oxygen is supplied to the cathode. The electrode reactions that occur at the anode electrode and the cathode electrode are expressed as follows.

$$\text{Anode: } 2H_2 \rightarrow 4H^+ + 4e^- \quad (1)$$

$$\text{Cathode: } 4H^+ + 4e^- + O_2 \rightarrow 2H_2O \quad (2)$$

Through the electrode reactions expressed in (1) and (2) above, an electromotive force of approximately 1 V is generated at the fuel cell.

Such fuel cells are used as an automotive power source in the form of a fuel cell stack which includes several hundred fuel cells stacked one on top of another so as to meet the significant power requirement. The electric power to be used to drive the vehicle is extracted via a fuel cell system comprising the fuel cell stack and a gas supply mechanism that supplies the anode gas and the cathode gas to the fuel cell stack.

As shown in FIG. 1, a fuel cell stack 10 comprises a plurality of single cells 1 layered one on top of another, a pair of collector plates 2a and 2b, a pair of insulating plates 3a and 3b, a pair of end plates 4a and 4b and nuts 5 that interlock with four tension rods (not shown).

The single cells 1 are each constituted with a solid polymer fuel cell.

The pair of collector plates 2a and 2b are disposed on the outer sides of the stack of the plurality of single cells 1. The collector plates 2a and 2b are constituted of an electrically conductive material that does not allow gas to be transmitted through, such as a non-porous carbon sheet or a copper sheet. The collector plates 2a and 2b each include an output terminal 6 located over an area of an upper side thereof. The fuel cell stack 10 extracts electrons e⁻ generated at the individual single cells 1 and outputs the extracted electrons via the output terminals 6.

The pair of insulating plates 3a and 3b are respectively disposed on the outer side of the collector plate 2a and the outer side of the collector plate 2b. The insulating plates 3a and 3b are constituted of an insulating material such as rubber or resin.

The pair of end plates 4a and 4b are disposed respectively on the outer side of the insulating plate 3a and the outer side of the insulating plate 3b. The end plates 4a and 4b are constituted of a rigid metal material such as steel.

At one of the pair of end plates 4a and 4b, i.e., at the end plate 4a, a cooling water intake hole 41a, a cooling water outlet hole 41b, an anode gas intake hole 42a, an anode gas outlet hole 42b, a cathode gas intake hole 43a and a cathode gas outlet hole 43b are formed.

A fuel gas constituted of hydrogen is supplied through the anode gas intake hole 42a. The hydrogen may be directly supplied in the form of a hydrogen gas drawn from a hydrogen storage device or it may be supplied in the form of a hydrogen-containing gas obtained by refining a fuel containing hydrogen. The hydrogen storage device may be a high-pressure gas tank, a liquid hydrogen tank or a metal hydride tank. The hydrogen-containing fuel may be natural gas, methanol, or gasoline. Air, which is to act as an oxidizing gas, is supplied through the cathode gas intake hole 43a.

The nuts 5 interlock with threaded male portions formed at both ends of the four tension rods passing through the inside of the fuel cell stack 10. As the nuts 5 interlocking with the tension rods are tightened, the fuel cell stack 10 is fastened along the stacking direction. The tension rods are constituted of a rigid metal material such as steel. The tension rods will have undergone a surface treatment to ensure electrical insulation and thus, electrical shorting among the individual single cells 1 is prevented.

As shown in FIG. 2, each single cell 1 includes a membrane electrode assembly (hereafter referred to as an "MEA") 15, an anode separator 20 layered over one surface of the MEA 15 and a cathode separator 30 layered over another surface of the MEA 15.

The MEA 15 is constituted with an electrolyte membrane 1, an anode 12a, a cathode 12b, a pair of first reinforcing members 13a and 13b and a pair of second reinforcing members 14a and 14b. At one surface of the electrolyte membrane 1, the first reinforcing member 13a, the second reinforcing member 14a and the anode 12a are disposed in this order, whereas at another surface of the electrolyte membrane 1, the first reinforcing member 13b, the second reinforcing member 14b and the cathode 12b are disposed in this order.

The electrolyte membrane 1 is a proton-conductive ion-exchange membrane constituted of a solid polymer material such as a fluororesin. Over an outer edge area of the electrolyte membrane 1, an anode gas manifold 111 through which the anode gas flows, a cathode gas manifold 112 through which the cathode gas flows and a cooling water manifold 113, through which the cooling water vapor flows, are formed. At each of the four corners of the electrolyte membrane 1, an insertion hole 114, at which a tension rod is inserted, is formed.

The electrolyte membrane 1 demonstrates desirable electrical conductivity in a moist condition. For this reason, the electrolyte membrane 1 must be kept in an optimally moist condition, in order to assure better power generation efficiency by drawing out the best performance from the electrolyte membrane 1. Accordingly, the anode gas and the cathode gas to be delivered to the fuel cell stack 10 are humidified in advance. It is to be noted that the water used to keep the electrolyte membrane 11 in the optimally moist condition must be purified water. In other words, if water containing impurities is delivered to the fuel cell stack 10, the power generation efficiency will be compromised by the impurities built up at the electrolyte membrane 11.

The anode 12a and the cathode 12b are in contact with the electrolyte membrane 11. The anode 12a and cathode 12b are each constituted with a catalytic layer 121 and a gas diffusion layer 122. The catalytic layers 121 are formed at the surfaces of the anode 12a and cathode 12b facing the electrolyte membrane 11. The gas diffusion layers 122 are formed at the surfaces of the anode 12a and the cathode 12b facing the respective separators. The catalytic layers 121 are constituted of carbon black particles containing platinum. The gas diffusion layers 122 are constituted of a material assuring sufficient gas diffusion and electrical conductivity, such as a carbon cloth woven with carbon fiber thread.

The first reinforcing members 13a and 13b are disposed at the two surfaces of the electrolyte membrane 11 so as to be in contact with the outer edge area of the electrolyte membrane 11 where the anode 12a and the cathode 12b are not present. The pair of first reinforcing members 13a and 13b are members having a low modulus of elasticity, i.e., they are constituted of a material that does not expand or shrink due to specific humidity or temperature conditions as much as the material constituting the electrolyte membrane 11. However, the modulus of elasticity of the pair of first reinforcing members 13a and 13b must be higher than the modulus of elasticity of the electrolyte membrane 11. It is also desirable that the modulus of elasticity of the pair of first reinforcing members 13a and 13b be close to the modulus of elasticity of the electrolyte membrane 11. Similar manifolds and insertion holes are formed at the pair of first reinforcing members 13a and 13b at positions corresponding to the positions of the manifolds 111, 112 and 113 and the insertion holes 114 formed in the electrolyte membrane 11.

It is to be noted that materials with low moduli of elasticity satisfying the requirements listed above include, for instance, a PVDF (polyvinylidene fluoride) resin, a silicone rubber, a fluorine rubber, an EPDM (ethylene polyprenedien rubber), a silicone glue material and a olefinic glue material.

The second reinforcing member 14a is layered over the first reinforcing member 13a. The second reinforcing member 14b is layered over the first reinforcing member 13b. The second reinforcing members 14a and 14b are constituted of a material having a high modulus of elasticity, achieving a higher modulus of elasticity than the material constituting the first reinforcing member 13a and the first reinforcing member 13b. Similar manifolds and insertion holes are formed at the pair of second reinforcing members 14a and 14b at positions corresponding to the positions of the manifolds 111, 112 and 113 and the insertion holes 114 formed in the electrolyte membrane 11.

Materials with high moduli of elasticity satisfying the requirements listed above include PET (polyethylene terephthalate), PEN (polyethylene naphthalate) and PTFE (polytetrafluoroethylene).

The anode separator 20 includes an outer frame portion 20a and a flow passage portion 20b.

The outer frame portion 20a is in contact with the second reinforcing member 14a via a gasket 16a. Similar manifolds and insertion holes are formed at the outer frame portion 20a at positions corresponding to the positions of the manifolds 111, 112 and 113 and the insertion holes 114 formed in the electrolyte membrane 11.

The flow passage portion 20b is in contact with the anode 12a. The flow passage portion 20b includes a gas flow passage through which the anode gas is supplied to the anode 12a formed on the surface thereof in contact with the anode 12a. It also includes a cooling water flow passage through which cooling water to be used to cool down the fuel cell stack having become warm through power generation flows, formed on the surface located on the side opposite from the surface in contact with the anode 12a.

The cathode separator 30 includes an outer frame portion 30a and a flow passage portion 30b similar to those described above.

The outer frame portion 30a is in contact with the second reinforcing member 14b via a gasket 16b. Similar manifolds and insertion holes are formed at the outer frame portion 30a at positions corresponding to the positions of the manifolds 111, 112 and 113 and the insertion holes 114 formed in the electrolyte membrane 11.

The flow passage portion 30b is in contact with the cathode 12b. The flow passage portion 30b includes a gas flow passage through which the cathode gas is supplied to the cathode 12b formed on the surface thereof in contact with the cathode 12b. It also includes a cooling water flow passage formed at the surface located on the side opposite from the surface in contact with the cathode 12b.

It is to be noted that the cooling water flow passages are formed so that the cooling water flow passage formed at a given anode separator 20 and the cooling water flow passage formed at the cathode separator 30 adjacent to the particular anode separator 20 face opposite each other, and the two cooling water flow passages facing opposite each other form an integrated cooling water flow passage.

The anode separator 20 and the cathode separator 30 are each a separator constituted of a metal or carbon material.

As shown in FIG. 3, the outer edge area of the electrolyte membrane 11, which is readily subjected to the pressure from the gas flowing through a manifold or the reactive force imparted from a gasket, tends to become degraded. For this reason, it is necessary to assure a high level of rigidity in the outer edge area of the electrolyte membrane 11. The rigidity at the outer edge area of the electrolyte membrane 11 may be improved by increasing the mechanical strength at the outer edge area of the electrolyte membrane 11 with reinforcement disposed at the outer edge area of the electrolyte membrane 11.

As explained earlier, the electrolyte membrane 11 demonstrates desirable electrical conductivity in a moist condition. Thus, while it is in a dry condition when the fuel cell system is off, it is humidified during operation. In addition, since the electrode reactions (1) and (2) explained earlier are exothermic reactions, the electrolyte membrane becomes heated during operation.

For these reasons, the electrolyte membrane 11 expands and shrinks repeatedly as it is heated and cooled, humidified and dried.

However, a member constituted of a material having a high modulus of elasticity will hardly expand or shrink even as the electrolyte membrane 11 expands and shrinks. This means that if reinforcing members constituted of a material having a high modulus of elasticity is simply disposed at the two sides of the outer edge area of the electrolyte membrane 11 in order to improve the mechanical strength over the outer edge area of the electrolyte membrane 11, the electrolyte membrane 11 and the members constituted of the material with the high modulus of elasticity will rub against each other as the electrolyte membrane 11 expands and shrinks, resulting in degradation of the electrolyte membrane 11 through this process.

Accordingly, the first reinforcing members 13a and 13b having a low modulus of elasticity, are disposed so as to be in contact with the outer edge area of the electrolyte membrane 11 and then the second reinforcing members 14a and 14b having a high modulus of elasticity are disposed so as to shield the first reinforcing members 13a and 13b respectively.

The first reinforcing members 13a and 13b, having a modulus of elasticity close to that of the electrolyte membrane 11, expand and shrink just as the electrolyte membrane 11 expands and shrinks. Thus, by disposing the first reinforcing member 13a having a low modulus of elasticity between the electrolyte membrane 11 and the second reinforcing member 14a having a high modulus of elasticity and disposing the first reinforcing member 13b having a low modulus of elasticity between the electrolyte membrane 11 and the second reinforcing member 14b having a high modulus of elasticity, it is ensured that the electrolyte membrane 11 does not rub against the first reinforcing members 13a and 13b as it expands and shrinks and consequently, degradation of the electrolyte membrane 11 can be minimized. In addition, since the first reinforcing members 13a and 13b are constituted of a material having a low modulus of elasticity and a low coefficient of thermal expansion, the extent of degradation of the first reinforcing members 13a and 13b, bound to occur as the first reinforcing members 13a and 13b rub against the second reinforcing members 14a and 14b can be minimized. Furthermore, since the first reinforcing members 13a and 13b and the second reinforcing members 14a and 14b are disposed at the outer edge area of the electrolyte membrane 11, the extent of degradation of the electrolyte membrane 11 can be effectively minimized with improved mechanical strength assured at the outer edge area of the electrolyte membrane 11.

Since the first reinforcing members 13a and 13b are disposed by ensuring that the edges of the gas diffusion layers 122 do not come into direct contact with the electrolyte membrane 11, degradation of the electrolyte membrane 11 due to contact with the gas diffusion layers 122 can be prevented.

Figure 4:
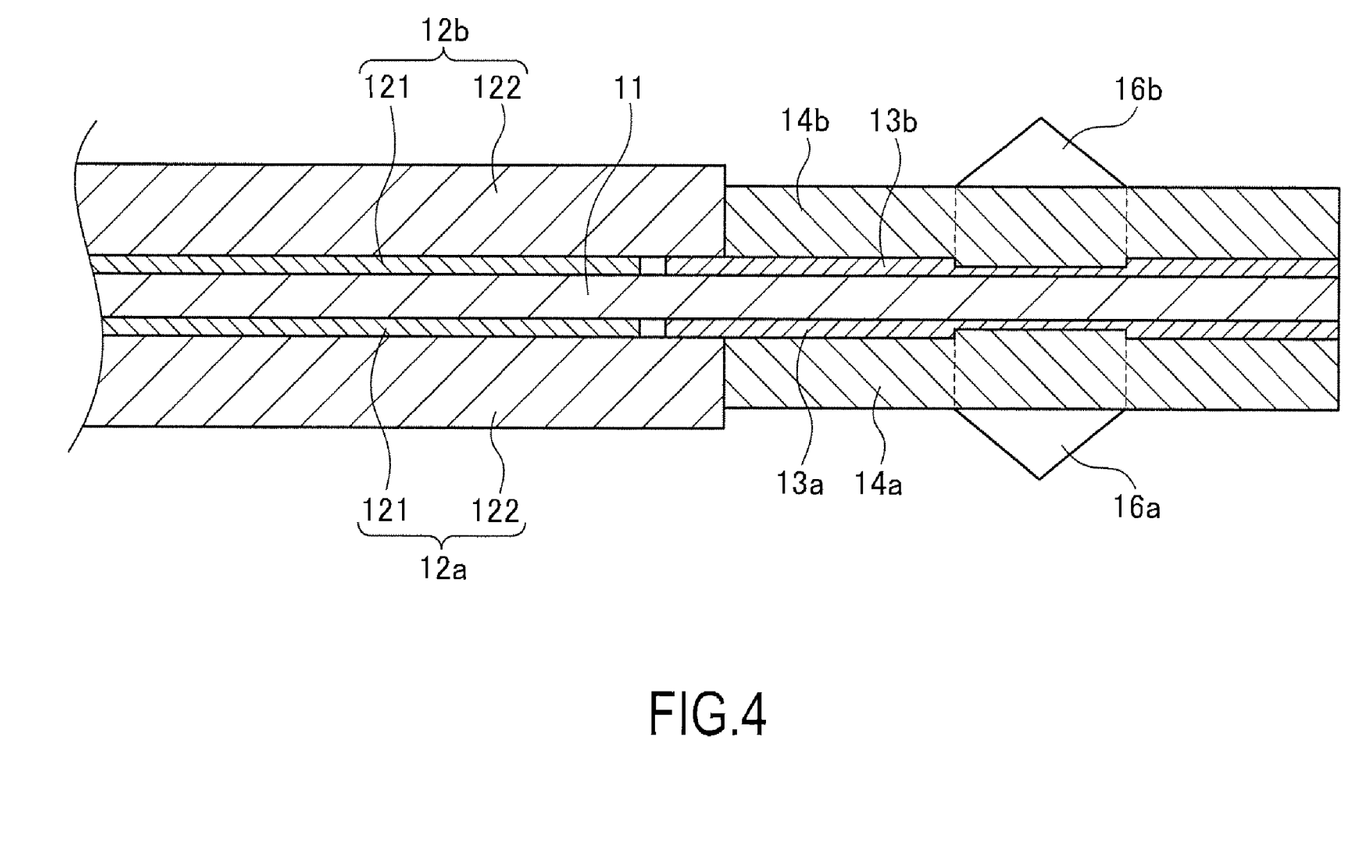
FIG. 4 illustrates a second embodiment of this invention in a view similar to that in FIG. 3.

In reference to FIG. 4, the second embodiment of this invention is described.

In this embodiment, the first reinforcing members 13a and 13b assume a smaller thickness and the second reinforcing members 14a and 14b assume a greater thickness over an area where the gaskets 16a and 16b are in contact with the second reinforcing members 14a and 14b respectively.

By assuming a greater thickness for the second reinforcing members 14a and 14b constituted of a material having a high modulus of elasticity over an area subjected to the reactive forces imparted from the gaskets 16a and 16b, the extent to which the electrolyte membrane 11 becomes deformed due to the reactive forces from the gaskets 16a and 16b can be reduced, in addition to achieving advantages similar to those of the first embodiment.

Figure 5:
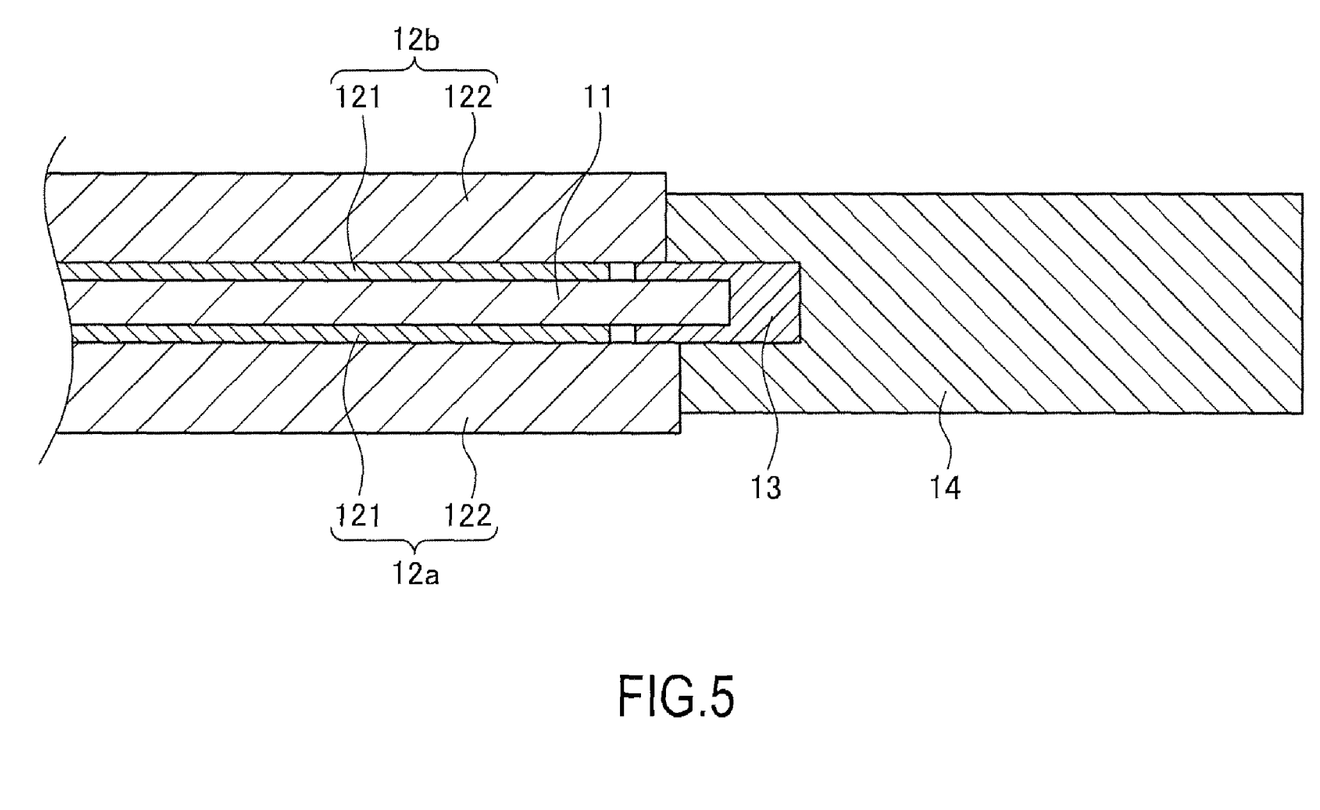
FIG. 5 illustrates a third embodiment of this invention in a view similar to that in FIG. 3.

In reference to FIG. 5, the third embodiment of this invention is described.

In this embodiment, an external portion of the electrolyte membrane 11 is shielded with a first reinforcing member 13 and an external portion of the first reinforcing member is shielded with the second reinforcing member 14.

By forming the second reinforcing member 14 having a high modulus of elasticity over an area subjected to the pressures from the gases flowing through the manifolds and the reactive forces imparted from the gaskets, the extent to which the electrolyte membrane 11 becomes deformed can be reduced, in addition to achieving advantages similar to those of the first embodiment.

Figure 6:
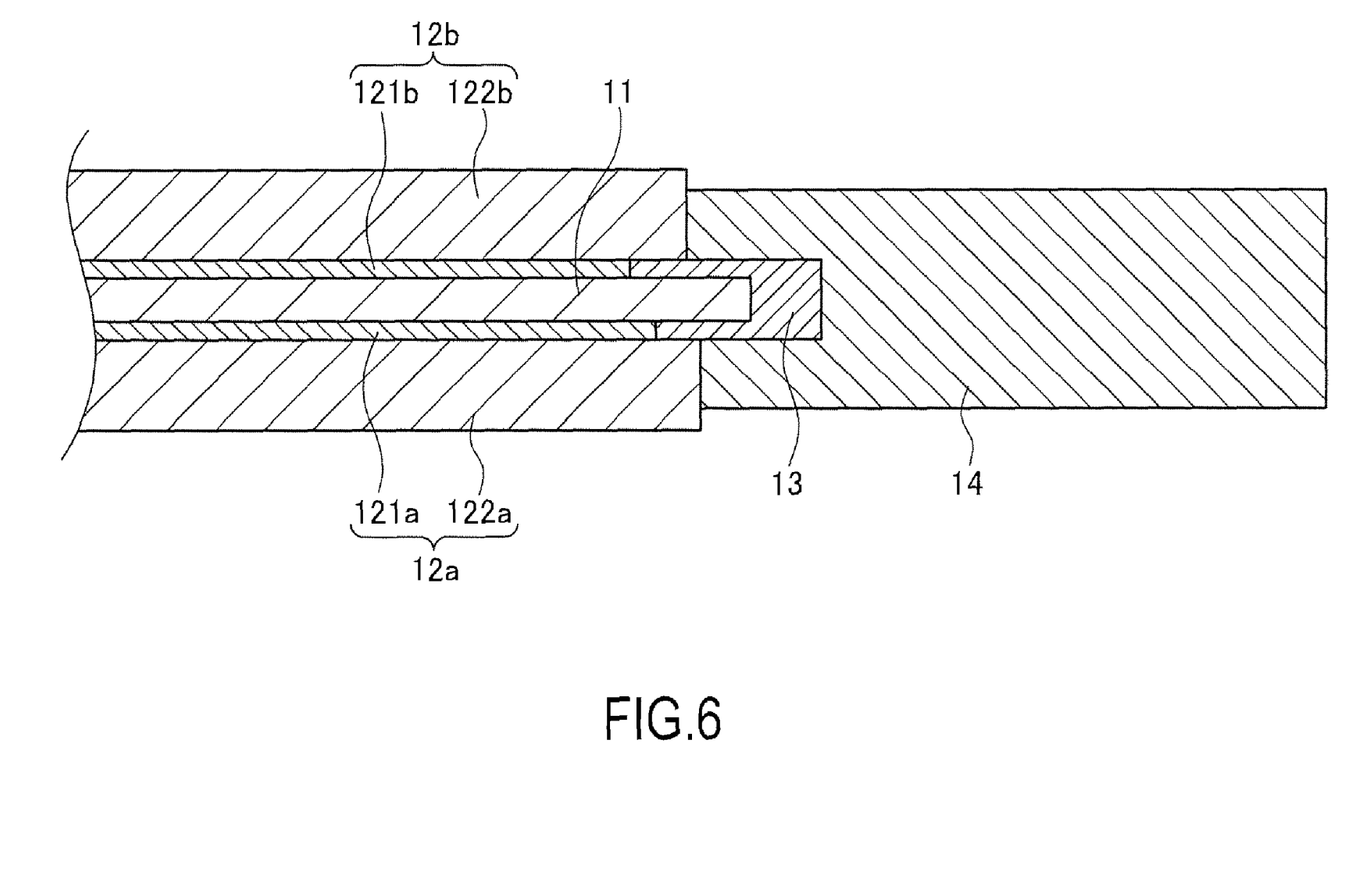
FIG. 6 illustrates a fourth embodiment of this invention in a view similar to that in FIG. 3.

In reference to FIG. 6, the fourth embodiment of this invention is described.

In order to ensure that the concept of this invention is better understood, degradation of the electrolyte membrane 11, attributable to an open circuit voltage (OCV) with the load cut off from the solid polymer fuel cell, is described.

In this embodiment, the anode gas and the cathode gas flow in parallel to each other, with their flows facing opposite each other across the MEA 15. In this situation, the upstream portion of the anode gas flow passage and the downstream portion of the cathode gas flow passage face opposite each other across the MEA 15 and the downstream portion of the anode gas flow passage and the upstream portion of the cathode gas flow passage face opposite each other across the MEA 15.

Under these circumstances, a discrepancy between the concentration of the anode gas and the concentration of the cathode gas flowing as they face opposite each other via the MEA 15, tends to occur. Since the gases are not completely blocked at the electrolyte membrane 11, such a discrepancy in the gas concentration may readily lead to a cross leak phenomenon whereby hydrogen is transmitted from the anode side toward the cathode side and oxygen or nitrogen is transmitted from the cathode side toward the anode side.

At the OCV in particular, the concentration of oxygen at the interface between the cathode 12b and the electrolyte membrane 11 becomes higher than the oxygen concentration during power generation. Thus, the quantity of oxygen diffusing from the cathode side to the anode side via the electrolyte membrane 11 becomes greater than the quantity of oxygen diffusing from the cathode side to the anode side via the electrolyte membrane during power generation.

As oxygen migrating from the cathode side to the anode side due to the cross leak phenomenon directly reacts with hydrogen on the anode side, as expressed in (3) below, hydrogen peroxide ($H_2O_2$) is generated. Hydrogen peroxide is also generated through a similar process as hydrogen migrates from the anode side to the cathode side and directly reacts with oxygen on the cathode side.

$$H_2+O_2 \rightarrow H_2O_2 \quad (3)$$

Such hydrogen peroxide is known to chemically degrade the electrolyte membrane 11 as it decomposes a component electrolyte (ionomer) contained in the electrolyte membrane 11, the anode 12a or the cathode 12b.

The relationship of the decomposition reaction of hydrogen peroxide to the potentials at the anode catalytic layer 121a and the cathode catalytic layer 121b is now examined.

On the cathode side with a relatively high potential of 0.6V to 1V, relative to the electrolytic potential, the hydrogen oxide liquid formed through the direct reaction between hydrogen present near the cathode and hydrogen having migrated through a cross leak from the anode catalytic layer 121a becomes decomposed into oxygen and protons relatively quickly through a reaction occurring as expressed in (4) below.

$$H_2O_2 \rightarrow O_2+2H^+ +2e^- \quad (4)$$

In contrast, the decomposition reaction of the hydrogen peroxide described above does not occur readily on the anode side assuming a lower potential.

Thus, hydrogen peroxide liquid is formed in a greater quantity on the anode side than on the cathode side. This means that the electrolyte membrane 11 tends to degrade more rapidly through oxidation attributable to the hydrogen per oxide liquid on the anode side.

Accordingly, the first reinforcing member 13 is made to contact the electrolyte membrane 11 over varying contact areas at the front surface and the rear surface of the electrolyte membrane 11. More specifically, the first reinforcing member 13 is made to contact the electrolyte membrane 11 over a greater contact area on the side where the first reinforcing member ranges next to the cathode 12b than on the side where it ranges next to the anode 12a.

Through these measures, the quantity of oxygen transmitted from the cathode side toward the anode side is reduced and thus, the extent of degradation of the electrolyte membrane 11 at the OCV can be minimized, in addition to achieving advantages similar to those of the third embodiment.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:
Japanese Patent Application No. 2008-50517 filed Feb. 29, 2008

INDUSTRIAL APPLICABILITY

As described above, this invention will bring about particularly desirable advantages when adopted in a membrane electrode assembly in a fuel cell for automotive applications.

Features exclusive to or characterizing this invention described in these embodiments are claimed as follows:

The invention claimed is:
1. A fuel cell membrane electrode assembly, comprising:
an electrolyte membrane;
electrodes, one disposed at one surface and another disposed at another surface of the electrolyte membrane so as to leave an electrolyte membrane outer edge area exposed;
at least one first reinforcing member arranged over the electrolyte membrane outer edge area having a higher modulus of elasticity than the electrolyte membrane and a smaller coefficient of thermal expansion than the electrolyte membrane;
at least one second reinforcing member disposed at a surface of a first reinforcing member, having a higher modulus of elasticity than the first reinforcing member; and
a gasket disposed at a surface of the second reinforcing member.

2. The fuel cell membrane electrode assembly as defined in claim 1, wherein:
the electrodes each include a catalytic layer in contact with the electrolyte membrane and a gas diffusion layer formed at a rear surface of the catalytic layer; and
first reinforcing members are each inserted between the electrolyte membrane and the gas diffusion layer.

3. The fuel cell membrane electrode assembly as defined in claim 2, wherein:
a first reinforcing member located on an anode side contacts the electrolyte membrane over a contact area smaller than a contact area over which a first reinforcing member located on a cathode side contacts the electrolyte membrane.

4. The fuel cell membrane electrode assembly as defined in claim 1, wherein:
a second reinforcing members assume a greater thickness in an area where the second reinforcing members are subjected to an external force than over an area where the second reinforcing members are not subjected to an external force.

5. The fuel cell membrane electrode assembly as defined in claim 4, wherein:
the second reinforcing members are subjected to an external force over an area where the second reinforcing members are in contact with gaskets disposed further outward relative to the second reinforcing members to prevent gas leakage.

6. The fuel cell membrane electrode assembly as defined in claim 4, wherein:
in the area where the second reinforcing members are subjected to the external force, a thickness of first reinforcing members is reduced relative to the thickness thereof over the area where the second reinforcing members are not subjected to the external force so as to allow an increase in the thickness of the second reinforcing members over the area where the second reinforcing members are subjected to the external force.

7. The fuel cell membrane electrode assembly as defined in claim 1, wherein:
first reinforcing members shield an external portion of the electrolyte membrane and second reinforcing members shield an external portion of the first reinforcing members.

8. A fuel cell, comprising:
an electrolyte membrane;
electrodes, one disposed at a front surface and another disposed at a rear surface of the electrolyte membrane so as to leave an electrolyte membrane outer edge area exposed;
first reinforcing members, one disposed at the front surface and another disposed at the rear surface of the electrolyte membrane over the electrolyte membrane outer edge area having a higher modulus of elasticity than the electrolyte membrane and a smaller coefficient of thermal expansion than the electrolyte membrane;

second reinforcing members disposed at front surfaces of the first reinforcing members, having a higher modulus of elasticity than the first reinforcing members;

a separator; and a gasket disposed at a surface of the second reinforcing members.

9. The fuel cell of claim 8, wherein the separator includes a manifold.

10. The fuel cell membrane electrode assembly as defined in claim 1, wherein the electrodes are arranged over the surfaces of the electrolyte membrane but the electrodes do not cover the outer edge area of the electrolyte membrane.

11. The fuel cell of claim 8, wherein the electrodes are arranged over the front and rear surfaces of the electrolyte membrane but the electrodes do not cover the outer edge area of the electrolyte membrane.

12. The fuel cell membrane electrode assembly as defined in claim 1, wherein the electrodes and the electrolyte membrane extend in a direction substantially perpendicular to a stacking direction of the fuel cell membrane electrode assembly, wherein the surfaces of the electrolyte membrane on which the electrodes are arranged face the stacking direction and the outer edge area of the electrolyte membrane, which is not covered by the electrodes, also faces the stacking direction.

13. The fuel cell of claim 8, wherein the electrodes and the electrolyte membrane extend in a direction substantially perpendicular to a stacking direction of the fuel cell, wherein the front and rear surfaces of the electrolyte membrane on which the electrodes are arranged face the stacking direction and the outer edge area of the electrolyte membrane, which is not covered by the electrodes, also faces the stacking direction.

14. The fuel cell membrane electrode assembly as defined in claim 1, wherein the outer edge area is located at a most peripheral portion of the electrode membrane in a direction transverse to a stacking direction of the fuel cell membrane electrode assembly.

15. The fuel cell of claim 8, wherein the outer edge area is located at a most peripheral portion of the electrode membrane in a direction transverse to a stacking direction of the fuel cell.

* * * * *